US010703263B2

(12) United States Patent
Salter et al.

(10) Patent No.: US 10,703,263 B2
(45) Date of Patent: Jul. 7, 2020

(54) VEHICLE LIGHT SYSTEM

(71) Applicant: Ford Global Technologies, LLC, Dearborn, MI (US)

(72) Inventors: Stuart C. Salter, White Lake, MI (US); Paul Kenneth Dellock, Northville, MI (US); Lori Ross, Royal Oak, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 15/950,626

(22) Filed: Apr. 11, 2018

(65) Prior Publication Data

US 2019/0315272 A1    Oct. 17, 2019

(51) Int. Cl.
| | | |
|---|---|---|
| *B60Q 3/217* | (2017.01) | |
| *B60Q 3/50* | (2017.01) | |
| *F21V 8/00* | (2006.01) | |
| *B60Q 3/78* | (2017.01) | |
| *B60J 10/84* | (2016.01) | |
| *B60Q 3/62* | (2017.01) | |

(52) U.S. Cl.
CPC .............. *B60Q 3/217* (2017.02); *B60J 10/84* (2016.02); *B60Q 3/50* (2017.02); *B60Q 3/62* (2017.02); *B60Q 3/78* (2017.02); *G02B 6/001* (2013.01)

(58) Field of Classification Search
CPC . B60Q 3/217; B60Q 3/62; B60Q 3/78; B60Q 3/50; B60J 10/84; G02B 6/001
See application file for complete search history.

(56) References Cited

U.S. PATENT DOCUMENTS

| | | | |
|---|---|---|---|
| 2,486,859 A | | 11/1949 | Meijer et al. |
| 3,902,784 A | * | 9/1975 | Dakss ................. G02B 6/3843 |
| | | | 385/76 |
| 5,053,930 A | | 10/1991 | Benavides |
| 5,434,013 A | | 7/1995 | Fernandez |
| 5,709,453 A | | 1/1998 | Krent et al. |
| 5,839,718 A | | 11/1998 | Hase et al. |
| 6,031,511 A | | 2/2000 | DeLuca et al. |
| 6,095,673 A | | 8/2000 | Goto et al. |
| 6,117,362 A | | 9/2000 | Yen et al. |
| 6,294,990 B1 | | 9/2001 | Knoll et al. |
| 6,419,854 B1 | | 7/2002 | Yocom et al. |
| 6,494,490 B1 | | 12/2002 | Trantoul |
| 6,577,073 B2 | | 6/2003 | Shimizu et al. |
| 6,729,738 B2 | | 5/2004 | Fuwausa et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jong-Suk (James) Lee
*Assistant Examiner* — Christopher E Dunay
(74) *Attorney, Agent, or Firm* — David Coppiellie; Price Heneveld LLP (57) ABSTRACT

A vehicle light system is provided herein. The vehicle light system includes a seal including an engagement member having first and second portions defining a channel and a cavity. The cavity is separated from the channel by the first portion. The first and second portions have varied opacities. A light guide is disposed within the cavity. A light source is operably coupled with the light guide.

20 Claims, 7 Drawing Sheets

(56) References Cited

U.S. PATENT DOCUMENTS

| | | | |
|---|---|---|---|
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | La Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,449,161 B2 | 5/2013 | Igoe et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,033,565 B2 | 5/2015 | Pfeil et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,108,569 B2 | 8/2015 | Gold |
| 9,187,034 B2 | 11/2015 | Tarahomi et al. |
| 9,254,785 B2 | 2/2016 | Sohizad et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 9,759,003 B2 * | 9/2017 | Hirakawa ............ E05F 15/443 |
| 2002/0126498 A1 * | 9/2002 | Atkinson ................ B60J 10/00 362/501 |
| 2002/0152686 A1 * | 10/2002 | Whitehead ............... B60J 10/00 49/475.1 |
| 2002/0159741 A1 | 10/2002 | Graves et al. |
| 2002/0163792 A1 | 11/2002 | Formoso |
| 2003/0012034 A1 * | 1/2003 | Misawa ............... B60Q 1/2607 362/545 |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0073852 A1 * | 4/2005 | Ward ...................... B60J 5/101 362/501 |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205074 A1 * | 8/2008 | Woodward .......... B60Q 1/0011 362/487 |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0313722 A1 | 10/2014 | Eloff et al. |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 * | 1/2016 | Collins ................ B60Q 1/268 362/464 |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |

(56) References Cited

U.S. PATENT DOCUMENTS

2017/0158125 A1    6/2017    Schuett et al.
2017/0253179 A1    9/2017    Kumada

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

VEHICLE LIGHT SYSTEM

FIELD OF THE INVENTION

The present disclosure generally relates to vehicle lighting assemblies, and more particularly, to vehicle lighting assemblies that may be disposed within a vehicle seal.

BACKGROUND OF THE INVENTION

Vehicle lighting applications continue to grow in popularity. Accordingly, a light system that may be integrated into a vehicle seal is provided herein that is operable to provide functional lighting as well as impart a stylistic element to the vehicle.

SUMMARY OF THE INVENTION

According to one aspect of the present disclosure, a vehicle light system is provided herein. The vehicle light system includes a seal including an engagement member having first and second portions defining a channel and a cavity. The cavity is separated from the channel by the first portion. The first and second portions have varied opacities. A light guide is disposed within the cavity. A light source is operably coupled with the light guide.

According to another aspect of the present disclosure, a vehicle light system is provided herein. The vehicle light system includes a seal including an engagement member and an attachment member. The engagement member has first and second portions defining a channel and a cavity. The cavity is separated from the channel by the first portion. A light guide is disposed within the cavity. A light source is operably coupled with the light guide. The light source is on an opposing side of the body panel from the seal.

According to yet another aspect of the present disclosure, a vehicle light system is provided herein. The vehicle light system includes a seal including an engagement member having a translucent portion. A light guide is disposed within the engagement member. A light source is operably coupled with the light guide.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
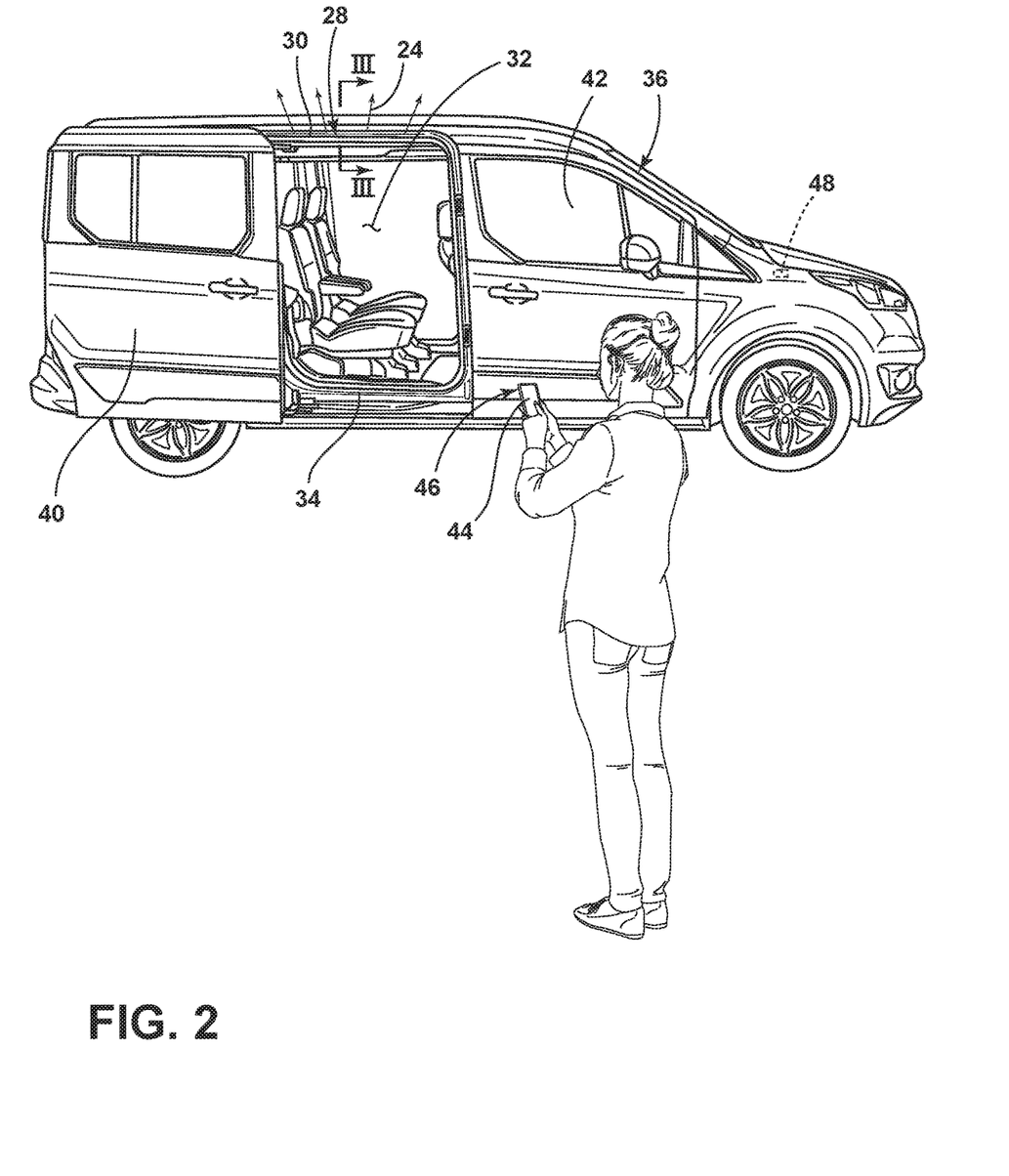
FIG. 2 is a side perspective view of a vehicle with a rear door in an open position, according to some examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system that may be integrated into a seal. In some examples, the seal may be illuminated to provide messages and/or information to onlookers of the vehicle. The seal may also be illuminated to provide additional light to a user of the vehicle. The seal may include an engagement member having first and second portions defining a channel and a cavity. The cavity may be separated from the channel by the first portion. The first and second portions may have varied opacities. A light guide may be disposed within the cavity. A light source is operably coupled with the light guide. The seal may be operably coupled with phosphorescent and/or luminescent structures to luminesce in response to predefined events. The luminescent structures may be configured to convert emitted light received from an associated light source and re-emit the light at a different wavelength generally found in the visible spectrum.

Figure 1A:
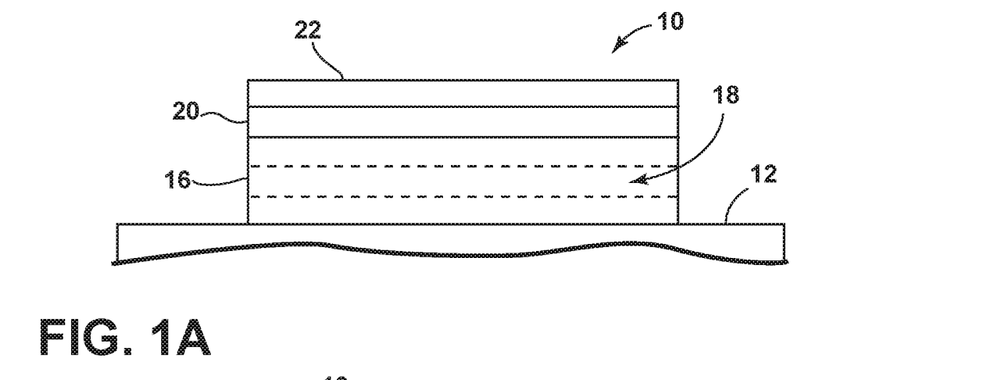
FIG. 1A is a side view of a luminescent structure rendered as a coating, according to some examples.
Figure 1B:
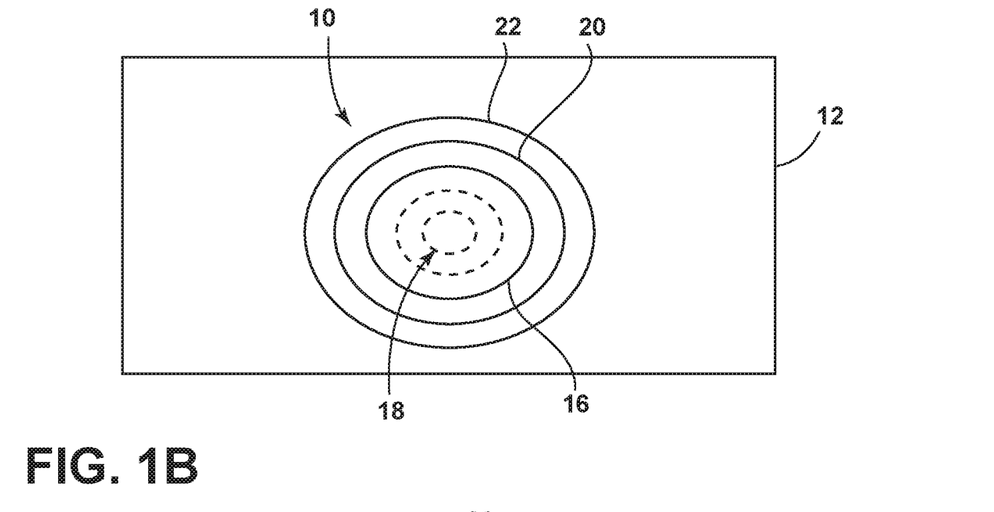
FIG. 1B is a top view of a luminescent structure rendered as a discrete particle, according to some examples.
Figure 1C:
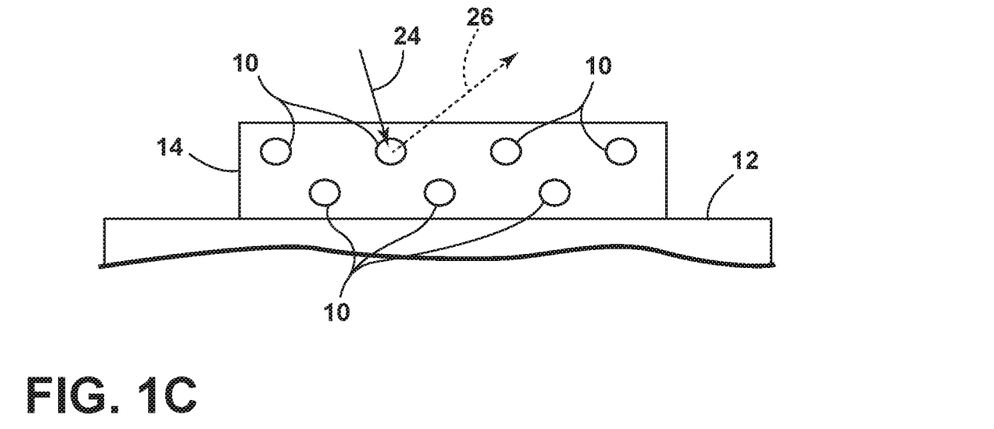
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an emitted light 24 of a specific wavelength, thereby causing the light to undergo a conversion process. Under the principle of down conversion, the emitted light 24 is converted into a longer-wavelength, converted light 26 that is outputted from the luminescent structure 10. Conversely, under the principle of up conversion, the emitted light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the emitted light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the emitted light 24 and the moment when the light intensity of the converted light 26 emitted from the luminescent structure 10 drops below a minimum visibility of 0.32 $mcd/m^2$. A visibility of 0.32 $mcd/m^2$ is roughly 100 times the sensitivity of the dark-adapted human eye, which corresponds to a base level of illumination commonly used by persons of ordinary skill in the art.

Figure 5:
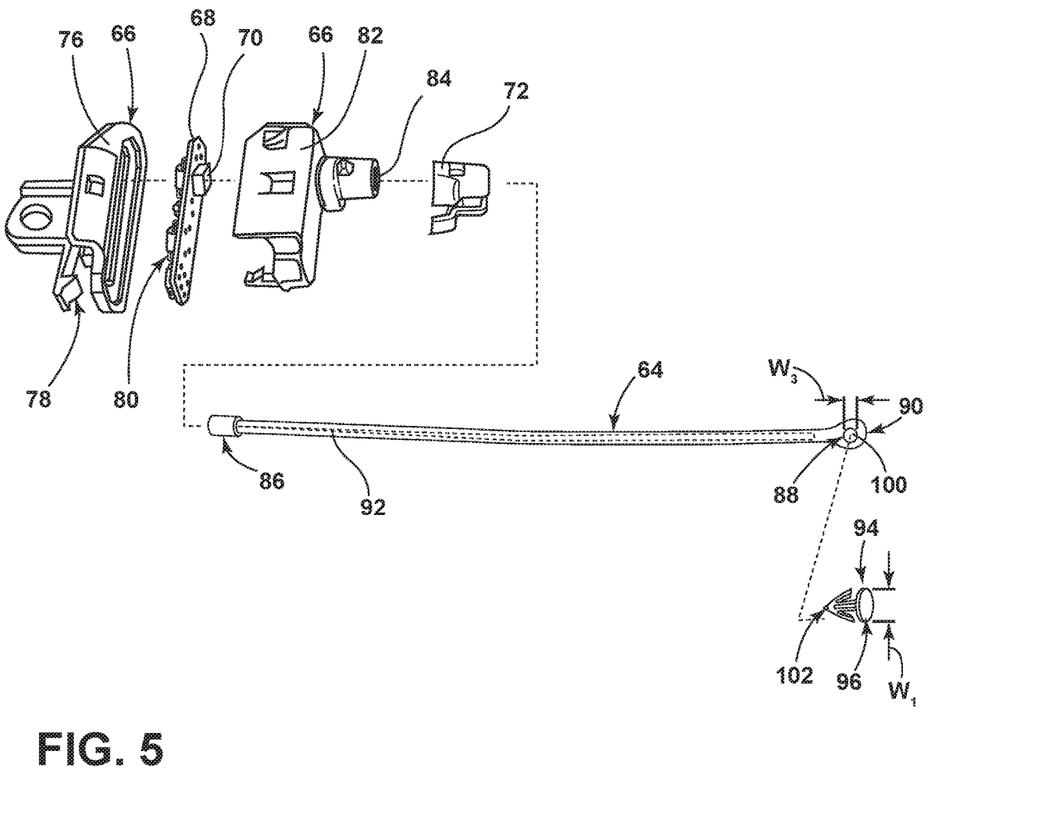
FIG. 5 is an exploded view of the light system, according to some examples.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue emitted light 24 emanated from light source 70 (FIG. 5). According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the emitted light 24. The emitted light 24 may be emitted from any excitation source (e.g., any natural light source, such as the sun, and/or any artificial light source 70). The long-persistence luminescent material 18 may be defined as having a long decay time due to its ability to store the emitted light 24 and release the converted light 26 gradually, for a period of several minutes or hours, once the emitted light 24 is no longer present.

The long-persistence luminescent material 18, according to various examples, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any one or more light source 70 that emit the emitted light 24, including, but not limited to, natural light source (e.g., the sun) and/or any artificial light source 70. The periodic absorption of the emitted light 24 from any excitation source may provide for a substantially sustained charge of the long-persistence luminescent material 18 to provide for consistent passive illumination. In various examples, a light sensor may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example, doped di-silicates, or any other compound that is capable of emitting light for a period of time once the emitted light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the emitted light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the emitted light 24 and d-d transitions of Mn2+ ions.

According to an alternate non-limiting example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Referring to FIG. 2, a light system 28 configured as a seal 30 that may illuminate an area proximate a body opening 32 defined by one or more body panels 34 of a vehicle 36, according to some examples, is illustrated. As shown, the seal 30 is attached to a periphery of the body panels 34 that define the body opening 32. The seal 30 is attached to a flange 38 (FIG. 3) projecting toward the body opening 32 from the body panel 34 of the vehicle 36 to provide a seal between a door 40 and the body panel 34 when the door 40 is placed in the closed position. The seal 30 may be sectioned and coupled to the body panel 34 of the vehicle 36. As shown and described in detail below, the seal 30 is configured to provide decorative and/or functional lighting. It should be appreciated that the seal 30 described herein may be utilized for any vehicle 36 such as, but not limited to, coupes, sedans, trucks, sport utility, vans, and the like. Further, it should be appreciated that any seal 30 found elsewhere on the vehicle 36 may also be manufactured in accordance with the principles of the present disclosure. For example, the seal 30 may be provided for sealing a space between the body panel 34 and a window 42.

With further reference to FIG. 2, the vehicle 36 may be utilized for personal and/or commercial purposes, such as for ride-providing (chauffeuring) services and/or ride-sharing services. An application 44 associated with the commercial purpose of the vehicle 36 may be installed on a user's electronic device 46. The application 44 may be configured to communicate with the vehicle 36 (either directly and/or through a remote station) and/or a vehicle-associated electronic device 48 that may be disposed within the vehicle 36 and/or remotely disposed. Through the communication between the user's electronic device 46 and the vehicle-associated electronic device 48, a commercial relationship may be established in which the vehicle 36 is used to facilitate a service.

The user's electronic device 46 and the vehicle-associated electronic device 48 may be any one of a variety of computing devices and may include a processor and memory. For example, the user's electronic device 46 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols. Further, the vehicle-associated electronic device 48 may be a computer or any other electronic device that is disposed within the vehicle 36.

In various examples, the vehicle 36 and/or the vehicle-associated electronic device 48 may communicate with the user's electronic device 46 through a wireless network. Accordingly, the network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks including a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The application 44 may be configured to utilize a device link interface to interact with the vehicle 36 and/or the vehicle-associated electronic device 48. When connected to the vehicle 36, the application 44 may be configured to utilize information from vehicle sensors, actuators, and electronic control units. The application 44 may also be configured to operate when untethered from the vehicle 36, such as when the user is riding public transportation or walking. The application 44 may be further configured to communicate with servers via a communications network. The user may interact with the application 44 through a human-machine interface (HMI) of the user's electronic device 46, via a web interface, or via an HMI of the vehicle 36, or through any other method.

With further reference to FIG. 2, the vehicle 36 may be a manually operated vehicle (i.e. using a human driver) or may be autonomously driven by an onboard computer. Additionally, or alternatively, the vehicle 36 may be remotely controlled (e.g., via an operator located in a different location). In autonomous examples, the computer may be configured for communicating with one or more remote sites such as a server via a network. The one or more remote sites may include a data store. The vehicle 36, including the computer, is configured to receive information, e.g., collected data, from the data collectors related to various components of the vehicle 36, e.g., a steering wheel, brake pedal, accelerator pedal, gearshift lever, etc. The computer generally includes an autonomous driving module that includes instructions for autonomously, i.e., without some, or any, operator input, operating the vehicle 36, including possibly in response to instructions received from the server. Further, the computer, e.g., in the module, generally includes instructions for receiving data, e.g., from one or more data collectors and/or an HMI, such as an interactive voice response (IVR) system, a graphical user interface (GUI) including a touchscreen or the like, etc.

The application 44 on the user's electronic device 46 and/or vehicle-associated electronic device 48 may also be configured to alter lighting characteristics of the light system 28. For example, the color of light emitted from the seal 30, the intensity of light emitted from the seal 30, and/or various portions of the seal 30 that are selectively illuminated. Moreover, the vehicle 36 may detect the position of the user's electronic device 46 and illuminate the seal 30 on a same side of the vehicle 36 as the user's electronic device 46.

Figure 3:
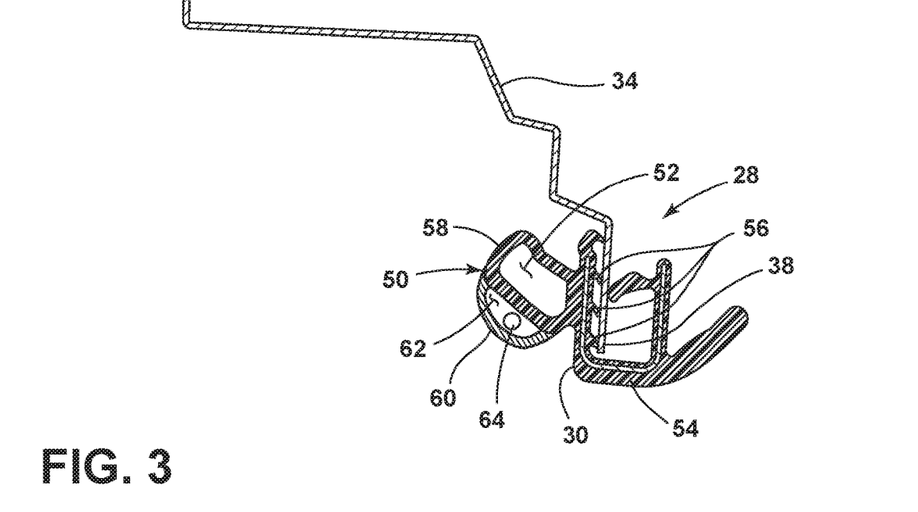
FIG. 3 is a cross-sectional view of a light system within a seal taken along line of FIG. 2.
Figure 4:
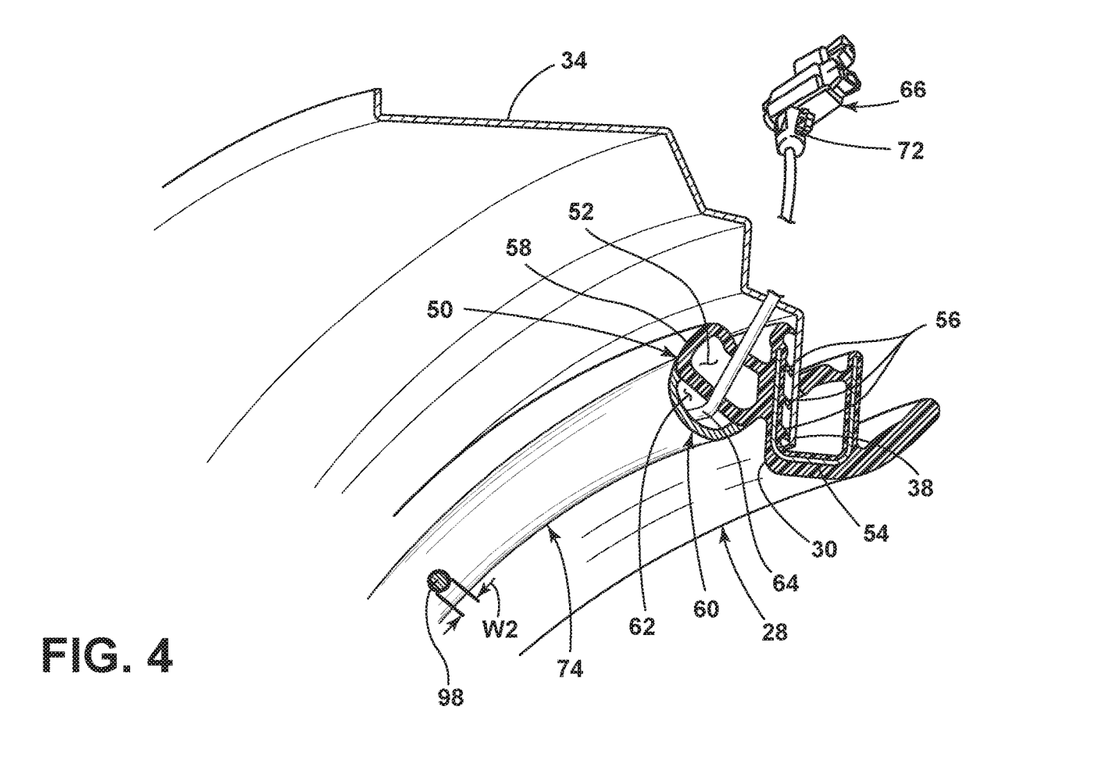
FIG. 4 is a partial perspective view of the seal coupled to a body of the vehicle, according to some examples.

Referring to FIGS. 3 and 4, the seal 30 is connected with the flange 38 and may be configured to abut a portion of the door 40. The seal 30 includes a tubular engagement member 50 that engages the door 40 when the door 40 is disposed in a closed position. The engagement member 50 may define a channel 52 that may be deformed when the engagement member 50 is contacted. The seal 30 further includes an attachment member 54 operably, or integrally, formed with the engagement member 50. The attachment member 54 may surround a portion of the flange 38. A plurality of protrusions 56 may extend from the attachment member 54 and engage the flange 38 to removably, or fixedly, maintain the seal 30 in a desired position. However, in alternate examples, the seal 30 may be held in a desired position through any other method known in the art, including, but not limited to, the use of fasteners and/or adhesives, compressing a portion of the seal 30 within a channel, etc. When the door 40 is closed, the engagement member 50 of the seal 30 contacts the door 40, which may create a seal and/or reduce unwanted NVH (noise, vibration, and harshness) within a passenger compartment of the vehicle 36. The seal 30 may be made of materials that are moldable by extrusion molding, injection molding, or any other process known in the art. For example, thermoplastic elastomers, resins, and/or rubbers may be used. In some instances, an olefin-based thermoplastic elastomer (TPO), a styrene-based elastomer (TPS), polyvinyl chloride resin (PVC), polypropylene resin (PP), an ethylene propylene diene copolymer (EPDM), and/or any other practicable material may be used.

In some examples, the engagement member 50 may include a first portion 58 and a second portion 60. In some instances, the first portion 58 may be disposed further from the body opening 32 than the second portion 60. Alternatively, in other words, the first portion 58 may be closer to the body panel 34 defining the body opening 32 than the second portion 60. The first and second portions 58, 60 may be formed from varied materials and/or have varied opacities, or transparencies, from one another. For example, in some examples, the first portion 58 may be substantially opaque, and/or translucent, while the second portion 60 is substantially transparent, or translucent. In some examples, the first and second portions 58, 60 may be coupled with one another through an extrusion process. In such instances, the seal 30 is formed by combining two separately formed extrusions by simultaneously passing both extrusions through a die or set of rolls having the shape of the final seal 30.

A cavity 62 is defined between the first and second portions 58, 60 of the engagement member 50. A light guide 64 may be disposed within the cavity 62. The light guide 64 may be operably coupled to the light source housing 66, which may encapsulate a circuit board 68 (FIG. 5) and a light source 70 (FIG. 5). In some examples, the housing 66 may be disposed on an opposing side of the body panel 34 from the engagement member 50. In such instances, the body panel 34 may define an opening through which the light guide 64 extends. For example, the housing 66 may be disposed between a headliner and a roof structure of the vehicle 36 in some examples.

A connector 72 is configured to attach the light guide 64 to the housing 66. The light guide 64 is configured to accept light emitted from the light source 70. The emitted light 24 is transmitted through the light guide 64 and exits the light guide 64 within the cavity 62. The emitted light 24 within the cavity 62 is directed through the second portion 60 of the seal 30 and may be used for functional and/or aesthetic illumination proximate the body opening 32 of the vehicle 36. As will be discussed in detail below, the light guide 64 may be flexible such that the seal 30 may accept repetitive deformation while minimizing structural degradation of the light guide 64. Moreover, the light guide 64 may fill a portion, or all, or the cavity 62 without departing from the scope of the present disclosure. Furthermore, the cavity 62 and/or second portion 60 of the engagement member 50 may itself function as the light guide 64 without departing from the scope of the teachings provided herein. In such examples, the second portion 60 of the engagement member 50 is optically coupled with the housing 66 and/or the light source 70.

The second portion 60 of the engagement member 50 may also define an integrally formed lens 74 to direct light in a desired direction. For example, the lens 74 may be configured as a Fresnel lens, a pillow optic, and/or any other type of lens or optic that is configured to disperse, concentrate, and/or otherwise direct light emitted from the light source 70 therethrough in any desired manner. The lens 74, according to some examples, may be configured as a convex lens structure. As light exits the lens 74, the light may be in a wide range of directions because of light dispersion characteristics of the convex lens structure. Thus, the light guide 64 provided herein, in some examples, is capable of improving the light dispersion effect of the light guide plate and product quality while increasing design flexibility and industrial applicable value thereof. However, it will be understood that any other geometry of lens 74 may be utilized, such as a concave lens, without departing from the teachings provided herein.

Referring to FIG. 5, the light source housing 66 may be formed from two components that may be removably attached to one another. However, in alternate examples, the housing 66 may be configured from any number (i.e. one or more) of components without departing from the scope of the present disclosure. A base portion 76 of the housing 66 may have an integrally formed compression clip 78, or other feature, that is configured to maintain the housing 66 in a substantially constant position within a concealed portion of the vehicle 36, such as a position between the body panel 34 and an interior trim component. However, in other examples, the housing 66 may be disposed in any other portion of the vehicle 36 without departing from the scope of the present disclosure.

The circuit board 68 is disposed on the base portion 76 or otherwise disposed within the housing 66, and contains a controller 80 having control circuitry including light source drive circuitry for controlling activation and deactivation of the light source 70. The circuit board 68 may be any type of circuit board including, but not limited to, any flexible printed circuit board (PCB) and/or rigid PCB. In alternate examples, the controller 80 may be disposed externally from the housing 66 without departing from the scope of the present disclosure.

The light source 70 may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the light system 28. Further, various types of LEDs are suitable for use as the light source 70 including, but not limited to, top-emitting LEDs, side-emitting LEDs, and others. Moreover, according to various examples, multicolored light source 70, such as Red, Green, and Blue (RGB) LEDs that employ red, green, and blue LED packaging may be used to generate various desired colors of light outputs from a single light source 70, according to known light color mixing techniques.

A top portion 82 of the housing 66 is configured to cover (or partially cover) the circuit board 68 and/or the light source 70. The top portion 82 of the housing 66 may also define a light output window 84. The light output window 84 allows light emitted from the light source 70 to exit the housing 66 therethrough and may be configured in any desired geometry.

With further reference to FIG. 5, a proximal end portion 86 of the light guide 64 is configured to be disposed within and/or operably coupled with the light output window 84 of the housing 66. Accordingly, in some examples, the light output window 84 and the proximal end portion 86 of the light guide 64 may have a substantially similar geometrical cross section. The connector 72 may be configured to surround the proximal end portion 86 of the light guide 64 and attach to the top portion 82 of the housing 66. The connector 72 is attached to the housing 66 through a snap feature; however, any type of attachment method may be utilized. Alternatively, the connector 72 may be integrally formed with the housing 66. When assembled, the connector 72 may be configured to maintain the proximal end portion 86 of the light guide 64 within the light output window 84.

Referring still to FIG. 5, the light guide 64 may be a substantially transparent or translucent guide suitable for transmitting light (e.g., light emitted from the light source 70). The light guide 64 may be a flexible light guide, wherein a suitable flexible material is used to create the light guide 64. Such flexible materials include, but are not limited to, urethane, silicone, flexible polycarbonate, optical grade flexible polypropylene, thermoplastic polyurethane (TPU), optical grade elastomeric, and/or any other flexible mold in clear (MIC) material or mixtures. The light guide 64 may be referred to as a light pipe, a light plate, a light bar or any other light carrying or transmitting substrate made from a clear or substantially translucent material. The light guide 64 may be formed through an injection molding process, or any other manufacturing process known in the art.

The flexible light guide 64 may have Durometer hardness below approximately 110 Shore A. According to some examples, the light guide 64 has a Durometer hardness of less than or equal to approximately 70 Shore A. According to alternate examples, the light guide 64 has a Durometer hardness that is less than or equal to approximately 60 Shore A. According to some examples, the light guide 64 may define a retaining portion 88 proximate a distal end portion 90 that may be formed as a single component with the remaining portions of the light guide 64, from a single material, and/or in a single manufacturing process. For example, the light guide 64 and the retaining portion 88 may all be integrally formed through an injection molding process. It will be appreciated that the retaining portion 88 may be disposed along any portion of the light guide 64 without departing from the teachings of the present disclosure.

Referring still to FIG. 5, the light guide 64 may have a tapered core 92 to direct light emitted from the light source 70 outwardly from the light guide 64. The tapered core 92 increases in thickness in the direction in which the excitation light 24 is transmitted. As a result, the amount of excitation light 24 transmitted therethrough is increased proximate the retaining portion 88 of the light guide 64. By using this arrangement, the power density of the excitation light 24 emitted through the engagement member 50 may be increased.

In some examples, a retainer 94 is disposed through the second portion 60 of the engagement member 50 and is inserted into, or otherwise coupled with, the retaining portion 88 of the light guide 64. The retainer 94 is configured to maintain the light guide 64 in a predetermined position within the cavity 62. In some examples, the retainer 94 may be formed from a resilient and/or deformable material so that the retainer 94 may be compressed and substantially return to its original shape. In some instances, the retainer 94 may include a proximal portion 96 that has a width $w_1$ that is wider than a width $w_2$ (FIG. 4) of an opening 98 (FIG. 4)

defined by the seal 30 and a width w₃ of a void 100 defined by the light guide 64. The retainer 94 may further include a compressible distal portion 102. The distal portion 102 may be configured to receive compressive forces when the engagement member 50 is contacted by an occupant and/or any other object, such as the door 40 of the vehicle 36.

Figure 6:
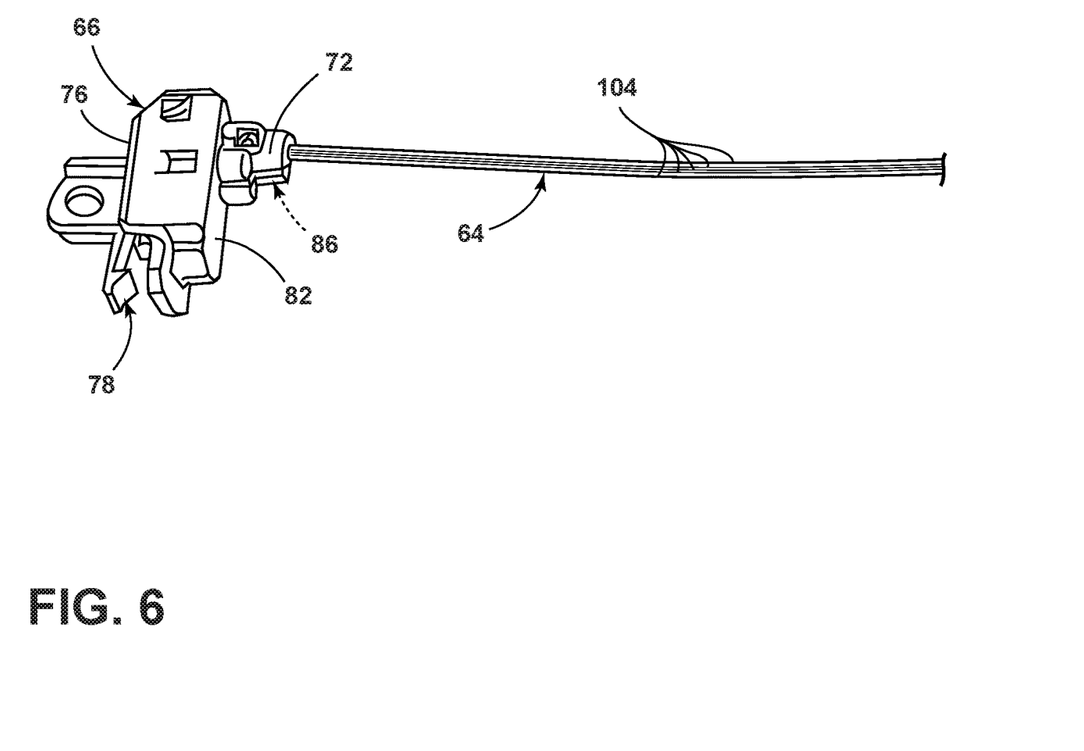
FIG. 6 is a perspective view of the light system having one or more optical fibers, according to some examples.

Referring to FIG. 6, the light guide 64 may be formed from and/or include one or more optical fiber strands 104 within the light guide 64, within the cavity 62, and/or within the second portion 60 of the engagement member 50. The one or more optical fiber strands 104, like the light guide 64, may be flexible to allow for placement of the optical fiber strands 104 into many locations within the vehicle 36. To increase the amount of light outputted from the light guide 64, the light source 70 may be configured as a laser diode that is optically coupled with the one or more optical fiber strands 104 and/or the light guide 64 in any of the examples provided herein.

Figure 7:
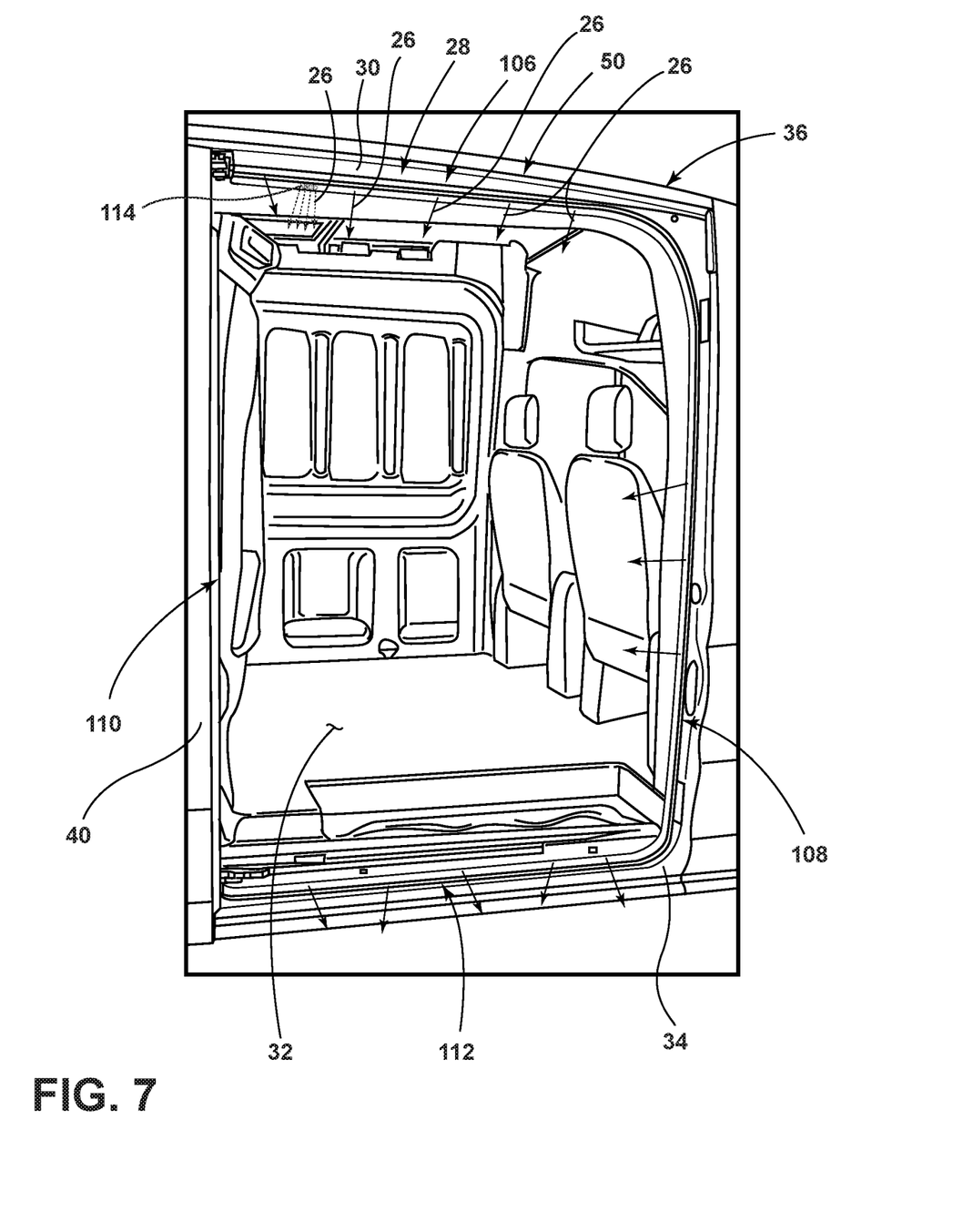
FIG. 7 is a perspective view of the seal having various illuminable portions, according to some examples.

Referring to FIG. 7, the second portion 60 of the engagement member 50 may be disposed in discrete locations of the seal 30 that is disposed around a periphery of a body opening 32 in some instances. For example, the second portion 60 may be located above a top portion 106 of the body opening 32, a vehicle forward portion 108 of the body opening 32, a vehicle rearward portion 110 of the body opening 32, a bottom portion 112 of the body opening 32, combinations thereof, and/or any other location without departing from the scope of the present disclosure.

With further reference to FIG. 7, in some instances, the vehicle 36 may include the luminescent structure 10 and/or indicia 114 on a portion of the seal 30. The light system 28 may be configured to direct emitted light 24 at the luminescent structure 10. In some examples, the luminescent structure 10 may define indicia 114 that signifies a make, model, feature of the vehicle 36, and/or other desired information. In some examples, the indicia 114 may not be readily visible when the light source 70 is in an unilluminated state and visible when the light source 70 is illuminated. In various instances, the luminescent structure 10 may form the indicia 114 that define one or messages, an emblem, a logo, an artistic design or any other desired information that may be visible when the luminescent structure 10 is in a luminescent and/or non-luminescent state. In operation, the luminescent structure 10 receives the excitation light from the light source 70 and, in response, luminesces. According to various examples, the luminescent structure 10 discussed herein is substantially Lambertian; that is, the apparent brightness of the luminescent structure 10 is substantially constant regardless of an observer's angle of view. As described herein, the color of the converted light 26 (FIG. 1C) may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending a first wavelength with a second wavelength.

Figure 8:
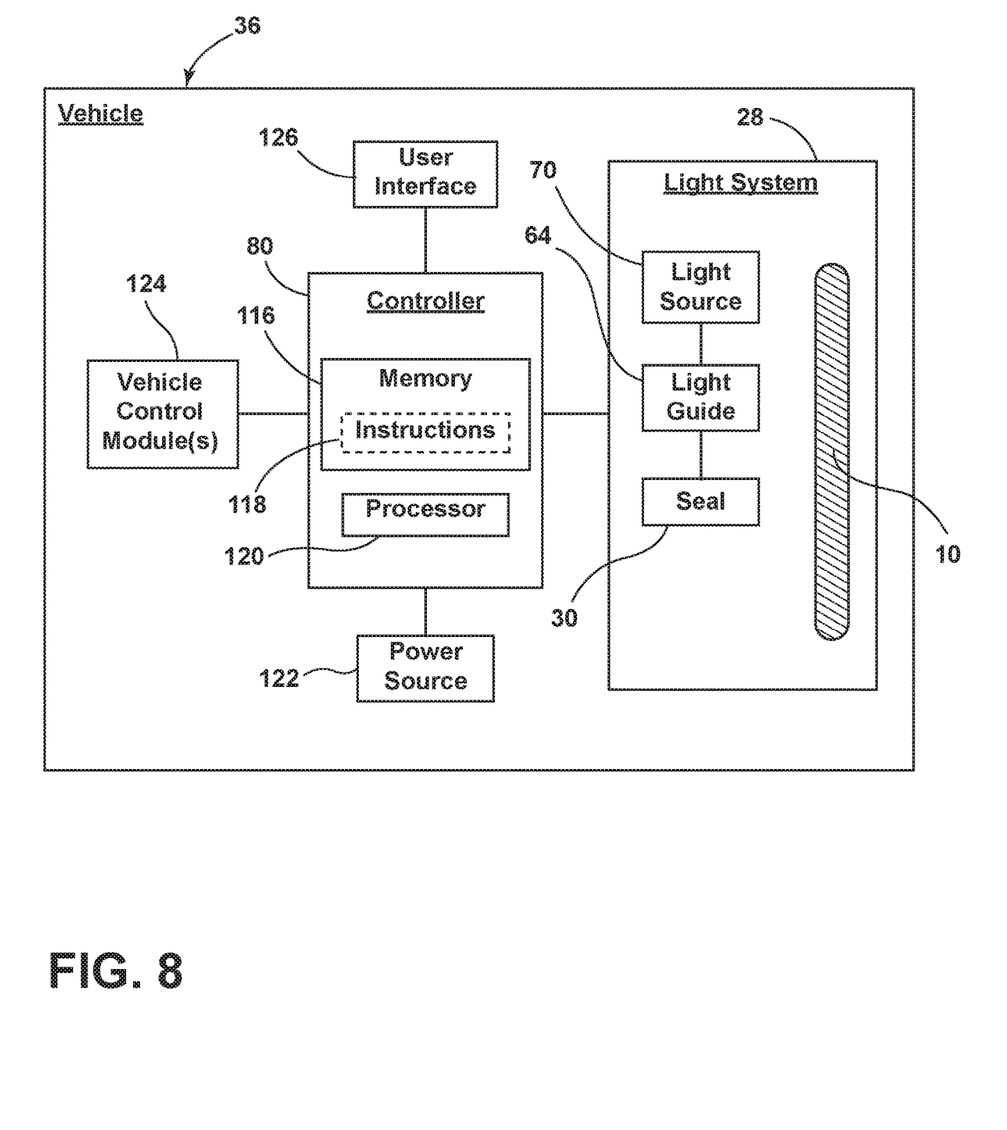
FIG. 8 is a block diagram of the vehicle incorporating the light system, according to some examples.

Referring to FIG. 8, the light system 28 is operably connected to the controller 80 and may correspond to a standalone controller or is otherwise integrated with an existing vehicle system. The controller 80 includes a memory 116 having instructions 118 stored thereon that are executable by a processor 120. The controller 80 is operably coupled with a power source 122. The instructions 118 may generally relate to ways in which to operate the light source 70 to affect the manner in which the seal 30 illuminates or luminesces. The controller 80 may also communicate with other vehicle modules 124 such as, but not limited to, an ambient light sensor, a speed sensor, a vehicle lighting control system, as well as a body control module of the vehicle 36. By leveraging these vehicle devices, the seal 30 may provide a variety of functional and/or aesthetic lighting. For example, the seal 30 may provide additional functional and/or aesthetic illumination proximate a body opening 32 when a vehicle door 40 is disposed in an open position. The seal 30 may also be illuminated during a welcome or departure event when a user unlocks or locks the vehicle 36. Further, the light system 28 may be operably coupled with a user interface 126. The user interface 126 may allow a user to control various lighting characteristics of the light source 70, such as, but not limited to, the intensity, the timing, the color, etc. of the emitted light 24. While a few specific examples have been provided herein, it will be apparent to those of ordinary skill in the art that the seal 30 may be illuminated to provide other types of lighting without departing from the scope of the present disclosure.

A variety of advantages may be derived from the use of the present disclosure. For example, use of the disclosed seal provides a unique aesthetic appearance to the vehicle. Moreover, the seal may provide lighting proximate the vehicle when a panel of the vehicle is disposed in an open position. The seal, and the light guide disposed within the seal, may be formed of a resiliently deformable material. The light guide may also be concealed and/or not readily visible to an occupant of the vehicle when the light source is deactivated. The seal may be manufactured at low costs when compared to standard vehicle lighting assemblies.

According to various examples, a vehicle light system is provided herein. The vehicle light system includes a seal including an engagement member having first and second portions defining a channel and a cavity. The cavity is separated from the channel by the first portion. The first and second portions have varied opacities. A light guide is disposed within the cavity. A light source is operably coupled with the light guide. Examples of the vehicle light system can include any one or a combination of the following features:

the light guide is formed from a flexible material;
 the seal is disposed proximate an opening of a vehicle that is defined by one or more vehicle body panels;
 the light source is disposed within a housing, the housing disposed on an opposing side of the body panel from the seal;
 the first portion is opaque and the second portion is translucent;
 the first and second portions of the seal are integrally coupled with one another through an extrusion process;
 the light guide fills a portion of the cavity;
 the second portion of the engagement member defines an integrally formed lens to direct light in a desired direction;
 a tapered core within the light guide to direct light emitted from the light source outwardly from the light guide;
 a retainer disposed through the second portion of the engagement member and coupled with a retaining portion of the light guide;
 one or more optical fiber strands within the light guide; and/or a luminescent structure disposed on a portion of the seal and configured to luminesce in response to light emitted from the light source.

Moreover, a method of manufacturing a vehicle light system is provided herein. The method includes forming a seal including an engagement member having first and second portions defining a channel and a cavity. The cavity is separated from the channel by the first portion. The first and second portions have varied opacities. The method further includes positioning a light guide within the cavity. Lastly, the method includes operably coupling a light source with the light guide.

According to some examples, a vehicle light system is provided herein. The vehicle light system includes a seal including an engagement member and an attachment member. The engagement member has first and second portions defining a channel and a cavity. The cavity is separated from the channel by the first portion. A light guide is disposed within the cavity. A light source is operably coupled with the light guide. The light source is on an opposing side of the body panel from the seal. Examples of the vehicle light system can include any one or a combination of the following features:

the first portion of the engagement member has a first transparency and the second portion of the engagement member has a second transparency that is different from the first transparency;

the light guide is formed from one or more optical fiber strands; and/or a tapered core within the light guide.

According to other examples, a vehicle light system is provided herein. The vehicle light system includes a seal including an engagement member having a translucent portion. A light guide is disposed within the engagement member. A light source is operably coupled with the light guide. Examples of the vehicle light system can include any one or a combination of the following features:

the light guide defines a retaining portion;

a retainer configured to operably couple the retaining portion of the light guide to the engagement member; and/or the light guide is disposed within a housing, the housing disposed on an opposing side of a body panel from the engagement member.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor examples discussed above might include computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle light system comprising:
a seal including an engagement member configured to engage a vehicle door, the engagement member having first and second portions, the first and second portions of the engagement member defining a channel and a cavity, wherein the cavity is separated from the channel by the first portion, and wherein the first portion is positioned between an attachment member of the seal and the second portion, the first and second portions having varied opacities;
a light guide disposed within the cavity, wherein the light guide is formed from a flexible material configured to accept repetitive deformation with minimized structural degradation of the light guide; and
a light source operably coupled with the light guide.

2. The vehicle light system of claim 1, wherein the flexible material of the light guide has a Durometer hardness of less than about 110 Shore A.

3. The vehicle light system of claim 1, wherein the seal is disposed proximate an opening of a vehicle that is defined by one or more vehicle body panels.

4. The vehicle light system of claim 2, wherein the light source is disposed within a housing, the housing disposed on an opposing side of the body panel from the seal.

5. The vehicle light system of claim 1, wherein the first portion is opaque and the second portion is translucent.

6. The vehicle light system of claim 1, wherein the first and second portions of the seal are integrally coupled with one another through an extrusion process.

7. The vehicle light system of claim 1, wherein the light guide fills a portion of the cavity.

8. The vehicle light system of claim 1, wherein the second portion of the engagement member defines an integrally formed lens to direct light in a desired direction.

9. The vehicle light system of claim 1, further comprising:
a tapered core within the light guide to direct light emitted from the light source outwardly from the light guide.

10. The vehicle light system of claim 1, further comprising:
a retainer disposed through the second portion of the engagement member and coupled with a retaining portion of the light guide.

11. The vehicle light system of claim 1, further comprising:
one or more optical fiber strands within the light guide.

12. The vehicle light system of claim 1, further comprising:
a luminescent structure disposed on a portion of the seal and configured to luminesce in response to light emitted from the light source.

13. A vehicle light system comprising:
a seal including an attachment member for coupling the seal with a side of a vehicle body and an engagement member for engaging with a vehicle door, the engagement member defining both a channel and a separate cavity extending within the length of the engagement member, and further wherein the cavity is defined outboard of the channel and the attachment member;
a light guide disposed within the cavity; and
a light source operably coupled with the light guide, the light source on an opposing side of the vehicle body panel from the seal.

14. The vehicle light system of claim 13, wherein a first portion of the engagement member has a first transparency and a second portion of the engagement member has a second transparency that is different from the first transparency.

15. The vehicle light system of claim 13, wherein the light guide is formed from one or more optical fiber strands.

16. The vehicle light system of claim 13, further comprising:
a tapered core within the light guide.

17. A vehicle light system comprising:
a seal extending about a periphery of a vehicle body panel and including:
an attachment member configured to couple the seal with the vehicle body panel; and
an engagement member having a translucent portion, wherein the engagement member is positioned outboard of the attachment member, and wherein the engagement member is configured to be deformed when contacted by a door;
a light guide disposed within a channel defined by, and deformable with, the engagement member; and
a light source operably coupled with the light guide.

18. The vehicle light system of claim 17, wherein the light guide defines a retaining portion.

19. The vehicle light system of claim 18, further comprising:
a retainer configured to operably couple the retaining portion of the light guide to the engagement member.

20. The vehicle light system of claim 17, wherein the light guide is disposed within a housing, the housing disposed on an opposing side of a body panel from the engagement member.

* * * * *